S. S. Wiles,
Liquid Measure.
No. 60,104. Patented Nov. 27, 1866.

Witnesses:
C. W. M. Smith
Geo. H. Strong

Inventor:
Srba. Squire. Wiles.

United States Patent Office.

IMPROVEMENT IN MEASURING-FAUCETS.

SEBA SQUIRE WILES, OF SANTA CLARA, CALIFORNIA.

Letters Patent No. 60,104, dated November 27, 1866.

SPECIFICATION.

TO ALL WHOM IT MAY CONCERN:

Be it known that I, SEBA SQUIRE WILES, of San José, of Santa Clara county, and State of California, have invented a new and improved Faucet and Gauge for Drawing and Measuring Liquids and Fluids; and I do hereby declare the following description and accompanying drawings are sufficient to enable any person skilled in the art or science to which it most nearly appertains, to make and use my said invention, without further invention or experiment.

The nature of my invention consists in providing a faucet for liquids or fluids, so constructed that it will allow them to be drawn rapidly, and at the same time will serve as a gauge to measure the quantity taken out. To effect this I make a cylinder or barrel, in which moves a piston connecting alternately with the containing vessel and the discharge pipe by means of a valve, so that the barrel may be filled by raising the piston and emptied by forcing it down. The quantity taken at each stroke is indicated by a gauge on the side of the barrel. In the accompanying drawings—

Figure 1:
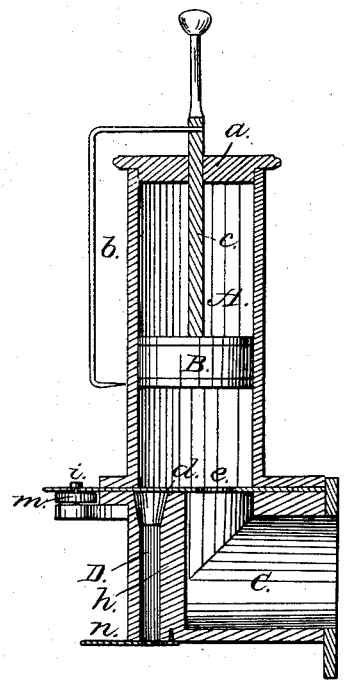

Figure 1 represents a side sectional elevation of my invention, showing the interior of it.

Figure 2:
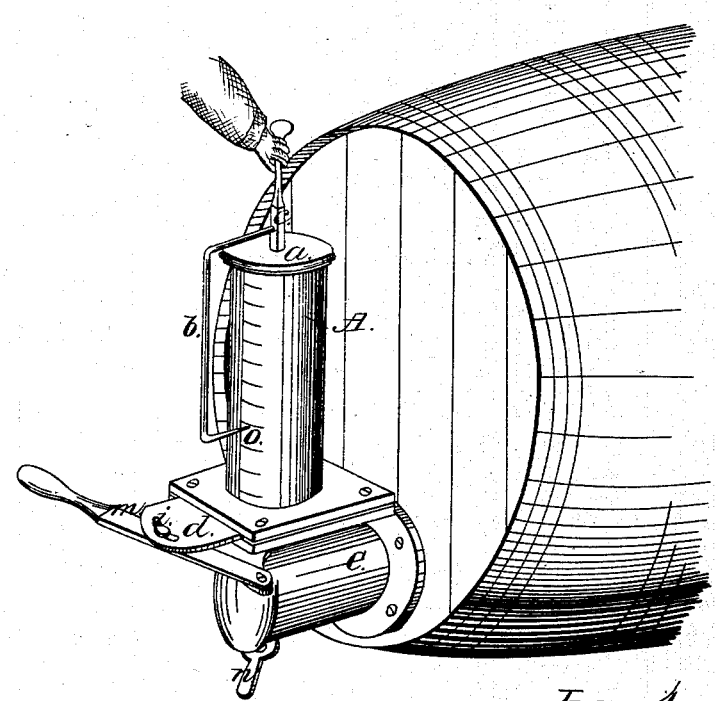

Figure 2, a perspective view showing its attachment to a cask.

Similar letters indicate like parts in each of the figures.

A is a cylinder or barrel, constructed of glass or metal, as may be found necessary or convenient. Within this barrel is a piston, B, of ordinary form, and moved by the square rod, $c$. $a$ is the cover of the cylinder and keeps the piston from turning, so that its attached index, $b$, will move in a line over the scale, $o$. A connecting pipe or tube, C, is attached to the lower end of the pump-barrel and opens into the vessel holding the liquids to be measured. This tube has a diaphragm, $h$, in it, placed transversely, so as to separate the part connecting with the cask from the discharge tube. A valve, $d$, is placed between the parts A and C of the faucet, and has an opening, $e$. This valve is operated by the lever $m$, attached to it by the pin, $i$. D is the discharge passage, and may be closed by the valve, $n$. To operate this mechanism, after being attached to a receptacle of liquid, the valve $d$ is so placed that the opening, $e$, connects the tube C, with the barrel A. The piston is then drawn up, thus creating a vacuum which will be filled with the liquid, and the scale $o$ being graduated to any required measure, the index $b$ will show the amount in the barrel. By moving the lever, $m$, the opening $e$ is now brought over the discharge passage D, and the connection with C is thus cut off. The piston being now forced down, the liquid contained in A below the piston is discharged, the valve $n$ being opened for the purpose. This invention has the advantage of being a measure or gauge as well as a faucet, while by the use of the piston to fill the barrel, the liquid can be rapidly drawn, without waiting it to flow by the action of gravitation, as with sirup.

Having thus described my invention, what I claim, and desire to secure by Letters Patent, is—

1. The faucet composed of the barrel A, and the feed and discharge passages C and D, with the valve $d$, operated substantially as described.

2. I also claim, in combination with the devices above claimed, the scale $o$, index $b$, and piston B, with its rod $c$, all arranged to operate substantially as and for the purpose set forth.

SEBA SQUIRE WILES. [L. S.]

Witnesses:
C. W. M. SMITH,
GEO. H. STRONG.